United States Patent [19]

Lucas et al.

[11] Patent Number: 4,528,353

[45] Date of Patent: Jul. 9, 1985

[54] ADHESION PROMOTERS FOR ONE-COMPONENT RTV SILICONE COMPOSITIONS

[75] Inventors: Gary M. Lucas, Scotia; John J. Dziark, Ballston Spa, both of N.Y.

[73] Assignee: General Electric Company, Waterford, N.Y.

[21] Appl. No.: 623,743

[22] Filed: Jun. 22, 1984

Related U.S. Application Data

[62] Division of Ser. No. 349,538, Feb. 17, 1982, Pat. No. 4,483,973.

[51] Int. Cl.³ .............................................. C08G 77/06
[52] U.S. Cl. ...................................... 528/21; 528/33; 528/34; 528/901
[58] Field of Search ...................... 528/21, 33, 34, 901

[56] References Cited

U.S. PATENT DOCUMENTS

| 4,395,526 | 7/1983 | White et al. | 528/21 |
| 4,417,042 | 11/1983 | Dziark | 528/21 |
| 4,483,973 | 11/1984 | Lucas et al. | 528/21 |

*Primary Examiner*—Melvin I. Marquis

[57] ABSTRACT

A self-bonding alkoxy-functional one-component RTV composition which contains as a self-bonding additive a silane which is functionalized by radicals selected from amino, ether, epoxy, isocyanato, cyano, acryloxy, and acyloxy. Such a composition is also shelf-stable and substantially non-corrosive.

10 Claims, No Drawings

ADHESION PROMOTERS FOR ONE-COMPONENT RTV SILICONE COMPOSITIONS

This application is a division of application Ser. No. 349,538, filed 02/17/82 now U.S. Pat. No. 4,483,973.

BACKGROUND OF THE INVENTION

The present invention relates to one-component RTV silicone rubber compositions, and more particularly the present invention relates to adhesion promoters or self-bonding additives for one-component RTV compositions.

An early type of one-component RTV composition is to be found in the disclosure of Ceyzeriat, U.S. Pat. No. 3,133,891 and Bruner, U.S. Pat. No. 3,035,016. These disclosures relate to acyloxy functional one-component compositions. In the course of time there were various inventions made of other types of RTV compositions having different functionalities; for instance, one-component ketoxime functional RTV compositions; amine functional RTV compositions; amide functional RTV compositions; aminoxy functional RTV compositions, etc.

During the course of development of such compositions, it was decided that it would be desirable for such compositions to have self-bonding additives; that is that the composition bond without a primer to various types of substrates with good adherency by the incorporation of such self-bonding additives. Examples of such self-bonding additives for such acyloxy functional RTV compositions are, for instance, to be found in disclosures of Kulpa, U.S. Pat. No. 3,296,161, Goossens, U.S. Pat. Nos. 3,296,195 and Beers, 3,438,930. The difficulty with such acyloxy functional compositions was that they were somewhat corrosive. That is, even though they were fast-curing and had other advantageous properties, they were found to be somewhat corrosive and gave off a pungent odor. Accordingly, it became desirable to develop compositions that were substantially non-corrosive and did not give off objectionable odors such that could be used in a crowded room. As stated previously, such compositions were one-component.

An example of a two-component RTV composition is, for instance, disclosed in Nitzsche et al U.S. Pat. No. 3,127,363. This patent discloses two-component compositions comprising a silanol polymer, a polysilicate cross-linking agent and preferably a tin salt of a carboxylic acid as a catalyst. While such a composition is packaged as a two-component system when it is desired to cure the composition the two components are mixed and the composition cures to a silicone elastomer. While such a composition had a sufciently rapid curing time and was non-corrosive, nevertheless it had to be mixed prior to the use of the composition which necessitated additional labor costs. Further, the composition once it was mixed did not have an extended shelf life. An early one-component system is to be found in Nitzsche et at U.S. Pat. No. 3,065,194 which discloses the utilization of a silanol polymer, an alkoxysilane cross-linking agent and a tin soap. While such a composition was one-component, nevertheless the composition did not have a sufficient shelf life. Further, special mixing procedures had to be utilized to prepare the composition, that is an extended drying cycle.

It was early recognized that such alkoxy functional one-component RTV systems had many advantages, and attempts were made to prepare such compositions as disclosed in Brown et al, U.S. Pat. No. 3,122,522 and Brown et al, U.S. Pat. No. 3,161,614, or U.S. Pat. No. RE-29760. However, these compositions did not have a sufficiently fast cure rate and had very poor shelf stability. Other alkoxy functional RTV compositions, for instance are to be found in Weyenberg U.S. Pat. No. 3,334,067, Cooper et al, U.S. Pat. No. 3,542,901, Smith et al, U.S. Pat. No. 3,689,454 and 3,779,986. These latter patents and specifically the Weyenberg and the Smith patent utilize specialized titanium chelate catalysts as condensation catalysts for such alkoxy functional one-component RTV compositions. Such titanium chelate catalysts were desirable in that they imparted to the alkoxy functional RTV a commercial cure rate; that is, the cure rate was such that the composition could be commercialized. However, the composition was still not a fast-curing one-component RTV system.

Another attempt to make such composition fast-curing and also have desirable shelf stability properties and self-bonding properties is to be found in the disclosure of Beers, U.S. Pat. No. 4,100,129. However, such composition still was not as fast-curing and still did not have as good a shelf stability as would be desirable.

It has been theorized recently that such earlier compositions suffered from the fact that there was excess methanol, silanol or hydroxy groups in the polymer system after it had been prepared even though it was prepared in the substantial absence of moisture. Such hydroxy groups in the polymer system resulted in the premature cross-linking of the polymers such that there resulted a poorly curing composition, that is one that did not have a sufficient cure rate and a good shelf stability. Accordingly, a system was devised in which there could be utilized a scavenger in the composition to react with excess hydroxy groups whether from methanol, silanol, or water, and would not react with the alkoxy groups to prematurely cross-link the RTV system. The disclosure of how this is accomplished as well as the scavenging systems for such a composition is for instance disclosed in the patent of White et al, U.S. Pat. No. 4,395,526 and in the U.S. patent of John B. Halgren, U.S. Pat. No. 4,377,706. The compositions of White, et al while sufficiently fast-curing and having shelf stability, nevertheless, had to be modified to meet certain requirements; that is, such compositions did not bond to most substrates. In the absence of a primer such compositions have very little or no self-bonding properties. Accordingly, it became highly desirable to develop self-bonding additives for such compositions. It should be noted that in addition to the self-bonding additives disclosed before, there are other patents on useful self-bonding additives for both two-component and one-component RTV systems. (RTV in this application refers to room temperature vulcanizable.) For instance, note Bessemer at al, U.S. Pat. No. 3,888,815 which relates to self-bonding additives for two-component RTV systems in which the functionality of the self-bonding additives, which in addition to alkoxy, may be selected from amino, carbonyl, carboxy, isocyano, azo, diazo, thio, thia, dithia, isothiocyano, oxo, oxa, halo, ester, nitrose, sulfhydryl, hydrocarbonylamido, sulfonamido and combinations thereof. Also note the disclosure of Smith, U.S. Pat. No. 4,147,685 which relates to primer compositions and specifically the acrylate functional silanes of that patent which may be utilized as self-bonding additives for RTV compositions and disclosed in the patent application of Keating, Ser. No. 109,727, filed on Jan. 4, 1980.

Other disclosures on self-bonding additives for RTV systems for instance are to be found in Beers, U.S. Pat. No. 4,100,129 which was referred to previously and Mitchell et al, U.S. Pat. No. 4,273,698. The Mitchell et al patent discloses various silyl fumarates, succinates, and maleates which can be utilized as self-bonding additives in one-component RTV systems. However, none of these patents which are all incorporated by reference in the present case, disclose self-bonding additives for the compositions of White et al, U.S. Pat. No. 4,395,526. A self-bonding additive is desirable, otherwise there has to be utilized a primer. The use of a primer involves added labor costs which are considerably more than the additional cost of a self-bonding additive when it is incorporated into the composition during the manufacture of the composition. Accordingly, it is highly desirable to have a self-bonding additive or additives in the compositions of White et al, U.S. Pat. No. 4,395,526.

It is one object of the present invention to provide for adhesion promoters or self-bonding additives for one-component alkoxy functional RTV compositions.

It is an additional object of the present invention to provide self-bonding additives for alkoxy functional, one-component RTV systems which self-bonding additives will give self-bonding properties to the RTV compositions and to most substrates.

It is yet an additional object of the present invention to provide adhesion promoters or self-bonding additives to alkoxy-functional one-component RTV systems which have a fast cure rate and are shelf stable and which self-bonding additives will affect the physical properties and the curing properties of the RTV system.

It is a further object of the present invention to provide a process for producing a self-bonding one-component alkoxy-functional RTV system which has a fast cure rate, and is shelf stable by incorporating in the RTV system self-bonding additives.

These and other objects of the present invention are accomplished by means of the disclosures set forth herein below.

SUMMARY OF THE INVENTION

In accordance with the above objects, there is provided by the present invention a stable, substantially anhydrous, and substantially acid-free room temperature vulcanizable organopolysilazane composition, having an effective amount of an adhesion promoter having the formula,

where $R^{10}$, $R^{11}$ are $C_{1-8}$ monovalent hydrocarbon radicals, t varies from 0 to 3 and Z is a saturated, unsaturated or aromatic hydrocarbon residue which may be further funtionalized by a member selected from the class consisting of amino, ether, epoxy, isocyanato, cyano, acryloxy and acyloxy and combinations thereof.

The most preferred self-bonding additives within the scope of Formula 1 are the amine functional silanes, then the epoxy functional compounds, and finally the other compounds coming within the scope of Formula 1. There is also envisioned by the present invention a process for forming such RTV compositions within the scope of the instant invention.

The self-bonding additives are most preferably applied to an end-capped polymer, that is a one-component RTV composition in which first the cross-linking agent is added to a silanol polymer preferably in the presence of a catalyst as disclosed in White et al, U.S. Pat. No. 4,395,526, and that after the end-capped polymer is formed, the scavenger is added so as to absorb the excess hydroxy groups in the polymer system. After the scavenger has absorbed the excess hydroxy groups in the system, then the tin soap condensation catalyst is added and the other ingredients so as to form the final composition. In this way, the most advantageous composition, that is, a fast-curing, non-corrosive, self-bonding, RTV composition is obtained which has good shelf stability.

DESCRIPTION OF THE PREFERRED EMBODIMENT

The present case relates to adhesion promoters or self-bonding additives for a particularly type of one-component RTV silicone rubber composition. It is necessary now to give some description of such one-component RTV composition. For a fuller description of such a composition, one is referred to the disclosure of White et al, U.S. Pat. No. 4,395,526, which has been referred to previously.

There are certain expressions that are used in this application; one is reference to the composition as a "stable" composition.

As utilized hereinafter, the term "stable" as applied to the one-package, polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Another expression that is used is "substantially acid-free," with respect to defining the RTV silicone composition. The expression "substantially acid-free" with respect to defining the elastomer made from the RTV composition of the present invention upon exposure to atmospheric moisture means yielding by-products having a pKa of 5.5 or greater with 6 or greater preferred, and 10 or greater being particularly perferred.

Proceeding now to the RTV composition, the present invention is based on adhesion promoters for stable, substantially acid-free, one-package moisture curable polyalkoxy terminated organopolysiloxane RTV compositions, which are made by using a silanol terminated polydiorganosiloxane consisting essentially of chemically combined diorganosiloxane units of the formula

such as a silanol-terminated polydiorganosiloxane of Formula (8) below, where R is as defined below with an effective amount of certain silane scavengers for chemically combined hydroxy radicals. In the silanol-terminated polydiorgano-siloxane consisting essentially of chemically combined Formula (2) units, the presence of silicon bonded $C_{(1-8)}$ alkoxy radicals such as methoxy radical is not precluded. The hydroxy radicals which can be removed by the silane scavenger can be found in materials normally present in the RTV composition of the present invention, for example, trace amounts of water, methanol, silanol radicals on the silica filler (if used), the silanol polymer of Formula (8), or a silanol-terminated polymer having Formula (2) units. The silane scavenger useful for eliminating chemically combined hydroxy radicals in accordance with the practice of the invention preferably has the formula,

(3)

where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and defined more particularly below, X is a hydrolyzable leaving group selected from amido, amino, carbamato, enoxy, imidato, isocyanato, oximato, thioisocyanato, and ureido radicals. Desirable members are amino, amido, enoxy, and the more preferred is amino, for example, N-$C_{(1-8)}$ alkyl $C_{(1-8)}$ acylamino, a is an integer equal to 1 or 2 and preferably 1, b is a whole number equal to 0 or 1 and the sum of a+b is equal to 1 or 2. In Formula (3), where a is 2, X can be the same or different. The leaving group X reacts preferentially before $-OR^1$ with available $-OH$ in the RTV composition and provides an RTV composition substantially free of halogen acid, or carboxylic acid. The silane scavenger of Formula (3) is both the silane scavenger for hydroxy functional groups and a polyalkoxysilane cross-linking agent for terminating the silicone atom at each organopolysiloxane chain-end with at least two alkoxy radicals.

Among the ingredients of the RTV compositions which are formed as a result of the use of the hydroxy scavenger of Formula (3), is a silanol-free polydiorganosiloxane, chain-terminated with two or three $-OR^1$ radicals. The silanol-free polydiorganosiloxane optionally can be combined with an effective amount of a cross-linking silane, as defined hereinafter, under substantially anhydrous conditions. The cross-linking polyalkoxysilane which can be utilized in combination with the scavenging silane of Formula (3) has the formula,

(4)

where $R^1$, $R^2$ and b are as defined above. The preferred condensation catalysts which can be used in the practice of the invention include metal compounds selected from tin compounds, zirconium compounds, and titanium compounds or mixtures thereof. Additional condensation catalysts which can be used are defined more particularly hereinafter.

It is not completely understood why the polyalkoxy-terminated organopolysiloxane compositions of the present invention are stable in the presence of certain condensation catalysts over an extended period of time in the substantial absence of moisture.

It is postulated that excess hydroxy groups whether in the form of an alcohol or silanol groups or water will cross-link and prematurely cure the polyalkoxy polymer in the package or alcohol groups may end-cap silanol polymers with monoalkoxy groups. If this occurs, then this is one the reasons it is believed that the cure rate of the polymer will slow down with the passage of time.

The use of the silane scavenger for hydroxy of Formulas (3) or (5) below, in which the leaving group X is not a halogen radical, substantially eliminates undesirable water in the filler and silicone polymer, as well as residual moisture in the RTV composition during the shelf period. In determining what level of silane scavenger of Formula (3) or (5) to use in the practice of the invention, the total hydroxy functionality of the RTV composition can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3% by weight, based on the weight of the polymer. The aforementioned 3% of scavenger by weight exceeds that amount required to substantially eliminate available hydroxy functionality in the polymer as a result of reaction between OH functionality and X radicals. In compositions which also contain filler and other additives, the additional amount of scavenger of Formulas (3) or (5) below which is required is estimated by running a 48-hour stability check at 100° C. to determine whether the tack-free time remains substantially unchanged as compared to the tack-free time of the composition before aging measured under substantially the same conditions.

Where polyalkoxy-terminated polymer of Formula (6) below is made without using silane scavenger of Formula (3), a silane scavenger can be used in the practice of the invention having less than two $-OR^1$ radicals attached to silicon, as shown by the formula,

(5)

where $R^1$, $R^2$, and X are as previously defined, c is a whole number equal to 0 to 3 inclusive, d is an integer equal to 1 to 4 inclusive, and the sum of (c+d) is equal to 3 or 4. In such situations, the scavenging silanes of formula (5) can be used in an amount sufficient to stabilize the RTV composition as previously defined for the scavenging silane of Formula (3). In addition, there can be used with scavengers of Formulas (3) or (5) at least 0.01 part and up to 10 parts of the cross-linking silane of formula (4).

The polyalkoxy-terminated organopolysiloxane of the present invention has the formula,

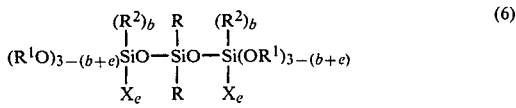

where R, $R^1$, $R^2$, X, n and b are as previously defined and e is equal to 0 to 1 and the sum of b+e is equal to 0 to 1. The polyalkoxy-terminated organopolysiloxane of Formula (6), can be made by various procedures. One procedure is taught by Cooper et al U.S. Pat. No. 3,542,901 involving the use of a polyalkoxysilane with a silanol-terminated polydiorganosiloxane in the presence of an amine catalyst. A method not taught by Cooper et al is the use of the silane scavenger of Formula (3) as an end-capper with silanol-terminated polydiorganosiloxane used in the practice of the invention.

In Formulas (1–6), R is preferably selected from $C_{(1-13)}$ monovalent hydrocarbon radicals, halogenated hydrocarbon radicals and cyano alkyl radicals, $R^1$ is preferably a $C_{(1-8)}$ alkyl radical or a $C_{(7-13)}$ aralkyl radical $R^2$ is preferably methyl, phenyl, or vinyl.

The preferred X radicals in Formulas (3), (5) and (6) are amido, amino and enoxy, and the most preferred is amido.

It has been found advantageous to end-cap the silanol polymer with the cross-linking agent of Formula (4) first and then to add a scavenger so as to absorb all free silanol in the mixture. Accordingly, it is desirable to produce a polyalkoxy end-cap polymer as disclosed above in the production of the RTV composition and then add a scavenger in the composition so as to absorb all the moisture such that when the filler and other ingredients are added that any moisture in those ingredients will be absorbed by the scavengers and will not operate to degrade the system. Of course, it must be understood that the cross-linking agent and the silanol polymer must be as dry as possible with the exception of the silanol groups in the polymer. The preferred process for doing this is to take the silanol polymer, react it with a cross-linking agent such as methyltrimethoxysilane in the presence of a condensation catalyst which may be one of the condensation catalysts disclosed in the White et al U.S. Pat. No. 4,395,526, such as for instance di-n-hexylamine. Other amines may be utilized as condensation catalysts as disclosed in the foregoing U.S. Pat. No. 4,395,526. Once the preferred end-capped polymer is produced, then the scavenger is added along with the other ingredients so that the scavenger absorbs the excess hydroxy groups that may be present in the end-cap polymer as well as absorb the moisture in the filler and other ingredients that are added to produce the one-component RTV system.

It has been further found that improved cure rates can be achieved if minor amounts of amines, substituted guanidines, or mixtures thereof, are utilized as curing accelerators in the polyalkoxy compositions of the present invention. These curing accelerators also serve to catalyze the ability of the enoxy leaving group to act as a scavenger. There can be used from 0.1 to 5 parts, and preferably from about 0.3 to 1 part of curing accelerator, per 100 parts of the silanol-terminated polymer of Formula (1), or which consists of chemically combined units of Formula (2), or 100 parts of the polyalkoxy-terminated polymer of Formula (6) to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging condition. Its cure properties after the extended shelf period will be substantially similar to its initial cure properties, for example, tack-free time (TFT), shown by the RTV composition upon being freshly mixed and immediately exposed to atmospheric moisture.

It appears that the curing accelerators described herein, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, i.e. less than about 30 minutes which remains substantially unchanged after accelerated aging.

The RTV compositions of the present invention can cure to a depth of ⅛″ thickness within 24 hours. Durometer Hardness (Shore A) can then be determined and used to evaluate the cure of the compositions as shown in the examples.

In broader aspect, the present invention comprises a one-component substantially anhydrous room temperature vulcanizable organopolysiloxane composition stable under ambient conditions in the substantial absence of moisture over an extended period of time and convertible to a substantially acid-free tackfree elastomer comprising: (1) organopolysiloxane with a silicon atom in each polymer chain end terminated with at least two alkoxy radicals; (2) an effective amount of condensation catalyst, and (3) a stabilizing amount of scavenging silane of the formula

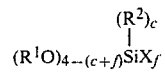

where $R^1$, $R^2$, X and c are as previously defined, f is an integer equal to 1 to 4 inclusive, and the sum of c+f is equal to 1 to 4 inclusive. In addition, an effective amount of a curing accelerator selected from substituted guanidines, amines and mixtures thereof is used.

In a further aspect of the present invention, there is provided a stable room temperature vulcanizable polyalkoxy-terminated organopolysiloxane composition curable under ambient conditions to a tack-free, substantially acid-free elastomer comprising, (A) 100 parts of a polyalkoxy-terminated organopolysiloxane of Formula (6);

(B) 0 to 10 parts of a cross-linking silane of Formula (4);

(C) an effective amount of condensation catalyst, and (D) a stabilizing amount of scavenging silane of Formula (7).

Also included within the scope of the present invention is a method of making a room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises (1) adding to the silanol-terminated organopolysiloxane a stabilizing amount of a polyalkoxysilane which is both a scavenger for hydroxy functional groups and a cross-linking agent of the formula

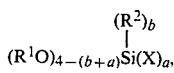

where $R^1$, $R^2$, X, a and b are as previously defined, and thereafter adding an effective amount of a condensation catalyst, whereby improved stability is achieved in the resulting room temperature vulcanizable organopolysiloxane composition.

Another method of the present invention is making a room temperature vulcanizable organopolysiloxane composition under substantially anhydrous conditions utilizing an effective amount of a condensation catalyst with an organopolysiloxane wherein the silicon atom at each polymer chain end is terminated with at least two alkoxy radicals, which involves the improvement which comprises adding to said polyalkoxy-terminated organopolysiloxane; (1) a stabilizing amount of a silane scavenger for hydroxy functional groups of the formula,

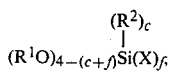

where $R^1$, $R^2$, X, c and f are as previously defined, and (2) an effective amount of a condensation catalyst, whereby improved stability is achieved in the resulting room temperature vulcanizable organopolysiloxane composition.

In an additional aspect of the present invention, there is provided a method of making a stable, one-package room temperature vulcanizable polyalkoxy-terminated organopoly-siloxane composition which comprises agitating, under substantially anhydrous conditions, a room temperature vulcanizable material selected from
  (i) a mixture comprising on a weight basis
    (a) 100 parts of a silanol-terminated polydiorganosiloxane consisting essentially of chemically combined units of Formula (2),
    (b) an amount of silane of Formula (3) sufficient to scavenge available —OH in the RTV composition and provide up to 3% by weight excess, based on the weight of RTV composition,
    (c) 0 to 10 parts of the cross-linking silane of Formula (4),
    (d) an effective amount of a condensation catalyst, and
    (e) 0 to 5 parts of curing accelerator selected from substituted guanidines, amines, and mixtures thereof wherein, the condensation catalyst is added after the silanol-terminated polydiorganosiloxane and scavenging silane are mixed; and
  (ii) a mixture comprising,
    (a) 100 parts of the polyalkoxy-terminated organopolysiloxane of Formula (6),
    (b) 0 to 10 parts of the cross-linking silane of Formula (4),
    (c) an effective amount of a condensation catalyst,
    (d) a stabilizing amount of silane scavenger of Formula (7), and
    (e) 0 to 5 parts of curing accelerator selected from substituted guanidines, amines and mixtures thereof.

Radicals included within R of Formulas (2) and (6) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included with $R^2$ are the same or different radicals included within R radicals. In Formulas (1–7), where R, $R^1$, and $R^2$, can be more than one radical, these radicals can be the same or different.

Some of the scavengers for chemically combined hydroxy radicals included within one or more of Formulas (3), (5) and (7), are, for example,
Oximatosilanes such as,
methyldimethoxy(ethylmethylketoximo)silane;
methylmethoxybis-(ethylmethylketoximo)silane;
methyldimethoxy(acetaldoximo)silane.
Carbamatosilanes such as,
methyldimethoxy(N-methylcarbamato)silane;
ethyldimethoxy(N-methylcarbamato)silane.
Enoxysilanes such as,
methyldimethoxyisopropenoxysilane;
trimethoxyisopropenoxysilane;
methyltri-iso-propenoxysilane;
methyldimethoxy(but-2-ene-2-oxy)silane;
methyldimethoxy(1-phenylethenoxy)silane;
methyldimethoxy-2(1-carboethoxy-propenoxy)silane.
Aminosilanes such as,
methylmethoxydi-N-methylaminosilane;
vinyldimethoxymethylaminosilane;
tetra-N,N-diethylaminosilane
methyldimethoxymethylaminosilane;
methyltricyclohexylaminosilane;
methyldimethoxyethylaminosilane;
dimethyldi-N,N-dimethylaminosilane;
methyldimethoxyisopropylaminosilane
dimethyldi-N,N-diethylaminosilane.
Amidosilanes such as,
ethyldimethoxy(N-ethylpropionamido)silane;
methylmethoxydi(N-methylacetamido)silane;
methyldimethoxy(N-methylacetamido)silane;
methyltri(N-metylacetamido)silane;
ethyldimethoxy(N-methylacetamido)silane;
methyltri(N-methylbenzamido)silane;
methylmethoxybis(N-methylacetamido)silane;
methyldimethoxy(caprolactamo)silane.
trimethoxy(N-methylacetamido)silane.
Imidatosilanes such as,
methyldimethoxyethylacetimidatosilane;
methyldimethoxypropylacetimidatosilane;
Ureidosilanes such as,
methyldimethoxy(N,N',N'-trimethylureido)silane;
methyldimethoxy(N-allyl-N',N'-dimethylureido)silane;
methyldimethoxy(N-phenyl-N',N'-dimethylureido)silane.
Isocyanatosilanes such as,
methyldimethoxyisocyanatosilane;
dimethoxydiisocyanatosilane;
Thioisocyanatosilanes such as
methyldimethoxythioisocyanatosilane;

methylmethoxydithioisocyanatosilane.

In addition, note the disclosure of patent application Chung, entitled Novel RTV Silicone Compositions and Processes Ser. No. 338,518, Filed Jan. 11, 1982, which discloses the use of certain pyrolidone silanes as scavengers in the composition of the instant composition. Such pyrolidonal silanes are amide silanes in the foregoing definition of scavengers that was given previously. Such cyclic amide silanes are more specifically described in the foregoing Chung docket for reference purposes.

In addition, Formula (5) scavenging silanes include silanes such as methyltris(N-methylacetamido)silane; tetra(isopropenoxy)silane. Also included are silanes having different leaving groups such as diethylamino (N-methylcarbamato)isopropenoxy(N-allylN', N'-dimethylureido)silane.

Some of the cross-linking polyalkoxysilanes included within Formula (4) are, for example, methyltrimethoxysilane; methyltriethoxysilane, ethyltrimethoxysilane; tetraethoxy-silane; vinyltrimethoxysilane; etc.

Among the curing accelerators which can be used in the practice of the invention are silyl substituted guanidines having the formula,

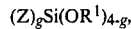

where $R^1$ is as previously defined, Z is a guanidine radical of the formula,

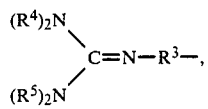

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula,

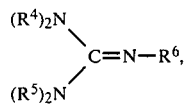

where $R^4$ and $R^5$ are as previously defined and $R^6$ is a $C_{(1-8)}$ alkyl radical, also can be employed. Some of the silyl substituted guanidines included within the above formula are shown by Takago U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, γ-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

It should be noted that in the foregoing compositions, it is disclosed that the composition may be prepared either in the alternative by first end-capping the silanol terminated diorganopolysiloxane polymer with an alkoxy functional cross-linking agent and then adding a scavenger, or alternatively, it may be produced by mixing the scavenger, the cross-linking agent, and the silanol terminated diorganopolysiloxane polymer at the same time to produce a desired one-component RTV mixture along with the other ingredients, or there may be applied mixtures of either procedure.

Irrespective of which composition is utilized, the silanol terminated diorganopolysiloxane polymer preferably has the formula

where R as previously defined is a $C_{(1-13)}$ monovalent substituted or unsubstituted hydrocarbon radical, preferably methyl or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon.

The production of such polymers is well known in the art and it will not be gone into here. An example of the use as well as explanation as to the preparation of such polymers is for instance to be found in Lampe et al, U.S. Pat. No. 3,888,815 which is hereby incorporated by reference. Preferably the silanol polymer base viscosity is in the range of 30,000 to 500,000 centipoise at 25° C.

The condensation catalyst may either be a metal salt of a carboxylic acid or it can be a titanium salt or a titanium chelate. Preferably, the cheaper tin soaps are utilized. Tin soaps allow the cure of the composition to proceed at a sufficiently fast rate as compared to titanium chelate catalysts and they are not as expensive.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula (8). There are included tin compounds, for example, dibutyltindilaurate; dibutyltindiacetate; dibutyltindimethoxide; carbomethoxyphenyl tin tri-suberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds such as dibutyltindiacetate and dibutyltindilaurate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the silanol terminated polydiorganosiloxane, which hereinafter will include Formula (8) or polymer consisting essentially of Formula (2) units along with the scavenging silane of Formula (3), and cross-linking silane of Formula (4), which is preferred where the blending is performed in the substantial absence of atmospheric moisture. Thereafter the condensation catalyst is added also in the substantial absence of atmospheric moisture.

As used hereinafter, the expressions "moisture-free conditions" and "substantially anhydrous conditions," with reference to making the RTV compositions of the present invention, mean mixing in a dry box, or in a closed container which has been subjected to vacuum to remove air, which thereafter is replaced with a dry inert gas, such as nitrogen. Experience has shown that sufficient scavenging silane of Formula (3) should be utilized as previously defined. Temperatures can vary from about 0° C. to about 180° C. depending upon the degree of blending, the types and amount of filler.

A preferred procedure for making the RTV composition of the present invention is to agitate under substantially anhydrous conditions, a mixture of the silanol terminated polydiorganosiloxane, filler and an effective amount of the scavenging silane of Formula (3) sufficient to effect the substantial elimination of hydroxy functional radicals and to end cap the polymer. This "end capping" and scavenging procedure can require several minutes, hours, or even days, depending upon such factors as the nature of the X leaving group, the number of $-OR^1$ radicals on the scavenging silane, etc. There then can be added to the substantially silanol-free mixture, the condensation catalyst, the cross-linking silane, or mixture thereof, along with other ingredient, for example, the curing accelerator and pigments. A stabilizing excess of the scavenging silane can be used in the initial or final stages of the mixing procedure if desired in amounts previously defined.

Irrespective of which mixing procedure is utilized, the preferably one-component RTV system will be obtained in accordance with the White et al disclosure which is shelf table and has a sufficiently fast cure rate under most conditions. For more details as to the preparation of such compositions, one is referred to White et al, U.S. Pat. No. 4,395,526. However, the invention of the instant case does not lie in such one-component systems by themselves but lies in the particularly defined adhesion promoters of Formula 1 for such a system. In such a formula, $R^{10}$ and $R^{11}$ are $C_{1-8}$ monovalent hydrocarbon radicals, and t varies from 0 to 3 and is preferably 0. The $R^{10}$ and $R^{11}$ radicals are selected from alkyl radicals, methyl, ethyl, propyl, etc., alkenyl radicals such as vinyl, allyl, etc., cycloalkyl radicals such as cyclohexyl, cycloheptyl, etc., mononuclear aryl radicals such as methyl-phenyl, etc., and fluoroalkyl radicals such as 3,3,3-trifluoropropyl. Most preferably, $R^{10}$ and $R^{11}$ are selected from methyl or ethyl and the definition of these symbols is the same in the formulas below.

The Z radical in Formula (1) is generally a saturated, unsaturated or aromatic hydrocarbon residue which may be further functionalized by a member selected from a class consisting of amino, ether, epoxy, isocyanato, cyano, acryloxy, acyloxy and multiples and combinations thereof. Generally, such adhesion promoters may be utilized anywhere up to an effective amount in the composition which can vary somewhat from adhesion promoter to adhesion promoter. Too much of the adhesion promoter will not yield any further desirable results and in some instances may detract from the physical properties of the cured RTV composition. Accordingly, generally the adhesion promoter is utilized at a concentration of anywhere from 0.1 to 10 parts and more preferably from 0.1 to 5 parts by weight per 100 parts by weight of the polyalkoxyorganopolysiloxane, or per 100 parts of the silanol terminated diorganopolysiloxane polymer of Formula (8). The concentration will be substantially the same for both situations since the endcap groups add very little to the molecular weight of the polymer, whether it be silanol terminated or endcapped.

Preferably, the adhesion promoter in one case has the formula

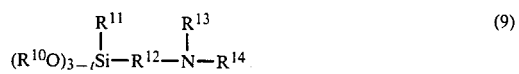
(9)

where $R^{10}$, $R^{11}$, t are as previously defined, and $R^{12}$ is a $C_{(2-12)}$ divalent hydrocarbon radical, $R^{13}$, $R^{14}$ are selected from the class consisting of hydrogen, amine radicals, and $C_{(1-8)}$ hydrocarbon substituted amine radicals and $C_{(1-8)}$ monovalent hydrocarbon groups and mixtures thereof.

Specifically, $R^{12}$ is selected from alkylene and arylene substituted or unsubstituted divalent hydrocarbon radicals of 2–12 carbon atoms and more preferably from 2–8 carbon atoms. The radicals $R^{13}$ and $R^{14}$ can be hydrogen or any of the $C_{(1-8)}$ monovalent hydrocarbon radicals disclosed for the $R^{10}$ and $R^{11}$ radicals. However, preferably, they can be selected from amine radicals and substituted amine radicals, such as for instance, aminoethyl. It is postulated that most of the strictly amine or nitrogen functionalized adhesion promoters of U.S. Pat. No. 3,888,815 which are disclosed in that patent can be utilized as adhesion promoters in the instant case. For a fuller description of such compounds, one is referred to the disclosure of the foregoing Bessemer et al patent, U.S. Pat. No. 3,888,815. Such compounds can be made, for instance, as set for in disclosure U.S. Pat. No. 2,930,890 and U.S. Pat. No. 2,971,864 which are incorporated by reference. Preferable compounds within the Formula (9) above are for instance, 3-(2-aminoethylamino)-propyltrimethoxy silane. Other compounds are $\gamma$-aminopropyltriethoxysilane and $\gamma$-aminopropyltrimethoxysilane. Other preferable amine adhesion promoters that can be utilized in the instant invention come within the scope of Formula (9) above are as follows:

$\gamma$-aminopropylmethyldiethoxysilane
$\gamma$-aminopropylmethyldimethoxysilane
Bis[3-(triethoxysilyl)propyl]amine
Bis[3-(triethoxysilyl)propyl]ethylenediamine
3-(2-aminoethylamino)-propyldimethoxy-t-butoxysilane
methacryloxyethylaminoethylaminopropyltrimethoxysilane
methylaminopropyltrimethoxysilane
methylaminopropyltriethoxysilane
(N,N-dimethyl-3-amino)propyltrimethoxysilane
N,N-dimethylaminophenyltriethoxysilane
N,N-dimethylaminomethyldimethoxysilane Accordingly, although most silanes functionalized by amines were not experimented with, it is envisioned that most silanes functionalized by amines should operate in the instant invention as adhesion promoters. These compounds are readily available in the silicone industry and from specialty chemical houses and can be readily prepared by reacting the appropriate unsaturated amine intermediate with a trimethoxysilane or a hydride silane with the appropriate substituent groups in the presence of a platinum catalyst to produce the desired compound. Further there are other processes for producing these compounds. More detail will not be given as to such preparations since such is well known in the art as is evidenced by the foregoing U.S. Pat. No. 3,888,815.

Another adhesion promoter that can be utilized in the instant invention is one of the formula

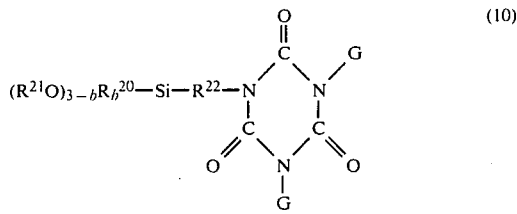

(10)

where G is selected from $R^{20}$ or $(R^{21}O)_{3-b} R_b^{20}$—Si—$R^{22}$ radical, styryl, vinyl, allyl, chloroallyl, cyclohexenyl, $R^{22}$ is a $C_{(2-12)}$ divalent hydrocarbon radical selected from alkylenearylene, alkylene, cycloalkylene and halosubstituted such divalent hydrocarbon radicals, and $R^{20}$ and $R^{21}$ are selected from the same radicals as $R^{10}$ and $R^{11}$ and also cyano alkyl, and b varies from 0 to 3.

For more information as to such compounds, one is referred to the disclosure of Beers, U.S. Pat. No. 4,100,129, and Berger, U.S. Pat. No. 3,821,218 which is hereby incorporated by reference.

The most preferred adhesion promoters within Formula (10) are 1,3,5-tristrimethoxysilylpropylisocyanate and bis-1,3-trimethoxysilylpropylisocyanurate. Again, much detail will not be given as to the preparation of such compounds. Such compounds are prepared by taking the corresponding alkoxy hydride silane and reacting it with the unsaturated isocyanurate or cyanurate in the presence of a platinum catalyst whereupon the hydride adds on to the unsaturated group such as the allyl group of the isocyanurate nucleus. The radical $R^{22}$ can be selected from any divalent hydrocarbon radical substituted or unsubstituted so long as it does not interfere with the adhesion promoter activities of the compound. It should be noted that highly complicated compounds are not desired as they are more difficult and thus more expensive to prepare and obtain. Other specific compounds within the scope of Formula (10) above are as follows:

1,3,5-tristrimethoxysilylpropylisocyanurate
1,3,5-tristrimethoxysilylethylisocyanurate
1,3,5,trismethyldimethoxysilylpropylisocyanurate
1,3,5,trismethyldiethoxysilylpropylisocyanurate Another adhesion promoter compound which may be utilized in the instant invention is, for instance, one having the general formula,

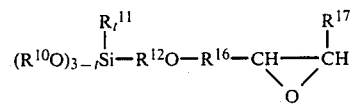

wherein the above Formula is within the scope of Formula (1) and where $R^{10}$ and $R^{11}$, t are as previously defined, $R^{12}$ is a $C_{(2-12)}$ divalent hydrocarbon radical, $R^{16}$ is a $C_{(2-12)}$ divalent hydrocarbon radical and $R^{17}$ is selected from the class consisting of hydrogen and a $C_{(1-8)}$ monovalent hydrocarbon radical. The radicals $R^{12}$ and $R^{16}$ can be any divalent hydrocarbon radicals such as alkylene radicals, arylene radicals, alkylenearylene radicals, both saturated and unsaturated as disclosed previously for the other compounds, and can be substituted or unsubstituted with various groups such as halogen groups, ether groups, ester groups and other hydrocarbon groups. The radical $R^{17}$ can be hydrogen or monovalent hydrocarbon radical and same as previously defined for $R^{10}$ and $R^{11}$ and is most preferably hydrogen. The most preferred compound within the scope of Formula (11) above is $\gamma$-glycidoxy propyltrimethoxysilane. Other specific compounds within Formula (11) above which are preferred as adhesion promoters in the instant invention are for instance, $\gamma$-glycidoxypropylmethyldimethoxysilane
$\gamma$-glycidoxypropyltriethoxysilane
$\gamma$-glycidoxypropylmethyldiethoxysilane
$\gamma$-glycidoxyethyltrimethoxysilane These compounds can be made by silicone producers as described in the literature or obtained from specialty chemical supply houses.

One process for producing such a compound such as that in Formula (11) is for instance taking an allyl glycidyl ether and reacting it with trimethoxyhydridesilane in the presence of a platinum catalyst. This reaction which is well known in the art is to add the trimethoxysilane onto the allyl group of the glycidyl ether so as to produce the desired specific adhesion promoter that was disclosed above. Tthis general reaction may be followed to produce other compounds coming within the scope of Formula (11) above.

Another group of compounds coming within the scope of Formula (1) above is adhesion promoters which have the formula,

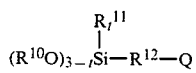  (12)

where $R^{10}$ and $R^{11}$, t are as previously defined, $R^{12}$ is a $C_{(2-12)}$ divalent hydrocarbon radical and Q is an epoxy functional radical having a saturated hydrocarbon ring appended thereto. The radical $R^{12}$ can be any divalent hydrocarbon radical substituted or unsubstituted, saturated or unsaturated, with substituent groups being selected from monovalent hydrocarbon groups, halogen groups, ether groups, ester groups, etc. It should be understood that in all foregoing formulas of adhesion promoters given in this application, the $R^{12}$ radical can be any divalent radical or 2 to 12 carbon atoms having monovalent hydrocarbon radicals, halogen radicals, ester radicals, ether radicals, and other radicals substituent thereto and $R^{12}$ radicals can be saturated or unsaturated and substituted or unsubstituted. Specific examples of such radicals are alkylene and arylene radicals and alkylenearylene combination radicals. A specific adhesion promoter coming within the scope of Formula (12) above is β-(3,4-epoxycyclohexyl)ethyltrimethoxy silane. Other compounds coming with the scope of Formula (12) above are as follows:

β-(3,4 epoxycyclohexyl)propyltrimethoxysilane
β-(3,4 epoxycyclohexyl)ethyltriethoxysilane
β-(3,4 epoxycyclohexyl)ethylmethyldimethoxysilane
β-(3,4 epoxycyclohexyl)ethylmethyldiethoxysilane
β-(3,4 enoxycyclohexyl)propylmethyldimethoxysilane
β-(3,4 epoxycyclohexyl)ethyltris(methoxyethoxysilane)

It should be noted that the Z radical in Formula (1) can also be an unsaturated radical such as vinyl or allyl radical of $C_{(2-12)}$ carbon atoms and can be substituted, unsubstituted, with groups such as monovalent hydrocarbon radicals, halogen groups, ester groups, and ether groups. Preferably, Z is $C_{(2-12)}$ olefinic hydrocarbon groups such as vinyl or allyl. The preferred compound coming within the scope of that formula, Formula (1), of the above definition is vinyltrimethoxysilane. Other compounds comining within the scope of Formula (1) above are as follows:
vinyltriethoxysilane
allyltrimethoxysilane
allyltriethoxysilane
vinylmethyldiethoxysilane
vinyltrimethoxysilane
vinyltris(2-methoxyethoxy)silane
such compounds where Z is an olefinic radical such as a vinyl compound can be produced for instance by reacting silicon metal with vinyl chloride or allyl chloride in the presence of a copper catalyst at high temperatures to produce the foregoing vinylchlorosilane and then taking this intermediate and alkoxylating it. This is a procedure well known in the art to silicone producers and such chemicals are readily available.

With respect to the compounds of formula (12) above, such compounds can be produced by reacting a hydride trimethoxy silane with a vinylcyclohexane oxide in the presence of a platinum catalyst at room temperatures or temperatures in the range of room temperature to 150° C. and then purifying the resulting product by distillation or other means that yield the desired -(3,4-epoxycyclohexyl)ethyltrimethoxy silane. Other compounds within the scope of Formula (12) above, can be produced in the same manner utilizing the same procedure as the above as is well known in the art.

Another compound within the scope of the present invention and within the scope of compounds of Formula (1) is one of the formula

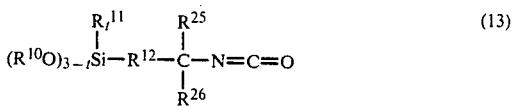  (13)

where $R^{10}$, $R^{11}$, t are as previously defined, $R^{12}$ is a $C_{(2-12)}$ divalent hydrocarbon radical in accordance with the previous definition given before for such radicals in the other formulas, and $R^{25}$ and $R^{26}$ are selected from a class consisting of hydrogen and $C_{(1-8)}$ monovalent hydrocarbon radicals.

The $R^{25}$ and $R^{26}$ radicals can be any of the radicals previously given for $R^{10}$ and $R^{11}$. More detail will not be given since such substituent groups have been sufficiently defined with respect to $R^{10}$ and $R^{11}$. Further, such compounds of Formula (13) can be produced by reacting an olefinic isocyanate such as allyl isocyanate with hydrotrimethoxysilane in the presence of a platinum catalyst. In all of the cases it has been disclosed that an alkoxylated product is being used such as trialkoxyhydride silane. This is for the case where t is equal to 0. In the case where t has a value of 1, 2, or 3 instead of the alkoxylated product, there can be utilized the corresponding $R^{11}$ intermediate to obtain a desired product. Accordingly, in the present case, if an alkoxylated product is not desired or a semialkoxylated product is desired, then of course instead of the hydride trialkoxysilane there will be used a hydride monoalkyl, dialkyl, silane. Such intermediates are well known in the art. At any rate, the compound of Formula (13) can be produced by adding on the desired hydride intermediate to the olefinic isocyanate compound to produce the desired reaction product.

Accordingly, specifically for the compounds of the instant case, allyl isocyanate may be reacted with trimethoxy hydride silane to produce the desired γ-isocyanatopropyltrimethoxysilane as the desired end product in the presence of the platinum catalyst under much the same conditions as was used to produce the other products. The compound does not need to have three methoxy groups. The appropriate intermediate can be utilized so that there can be 0, 1, 2, or 3 methoxy groups as is desired. Such intermediates are well known in the art. Along with the γ-isocyanatopropyltrimethoxysilane other compounds coming within the scope of Formula (13) are as follows:
isocyanatopropyltriethoxysilane
isocyanatopropylmethyldimethoxysilane
isocyanatopropylmethyldiethoxysilane
isocyanatoethyltrimethoxysilane Another group of adhesion promoters coming within the scope of Formula (1) above are compounds of the formula $$(R^{10}O)_{3-t}-\underset{\underset{R_t^{11}}{|}}{Si}-R^{12}C\equiv N \quad (14)$$

where $R^{10}$, $R^{11}$, t are as previously defined and $R^{12}$ is a $C_{(2-12)}$ divalent hydrocarbon radical and may be any of the $R^{12}$ radicals previously defined in this application; that is saturated or unsaturated, substituted or unsubstituted. A preferred specific compound within the scope of Formula (14) above is γ-cyanopropyltrimethoxysilane. Other specific compounds are as follows:
3-(cyanoethoxy)-3-methylbutenyltrimethoxysilane
β-cyanoethylmethyldimethoxysilane
β-cyanoethyltriethoxysilane
β-cyanoethyltrimethoxysilane
2-cyanoethylmethyldiethoxysilane
3-cyanopropyltriethoxysilane
cyanopropylmethyldimethoxysilane
1-cyanoethyltris(methoxyethoxy)silane Such compounds are produced by reacting an olefinic cyanide with a trichlorohydride silane in the presence of a platinum catalyst under much the same conditions that the other compounds were reacted to produce the desired intermediate and then alkoxylating this intermediate so as to produce the preferable γ-cyanopropyltrimethoxysilane. Accordingly, one specific type of reaction could be, for instance, allyl cyanide reacted with trichlorosilane. In this reaction the chlorosilane is reacted with the cyanide, otherwise, since the methoxy group will react with the cyanide group to lower the yield of the desired product if the methoxylated intermediate is used in the addition reaction with the platinum catalyst. Such reactions as was stated previously, are well known in the art for the production of such compounds, and such compounds may be produced and are well known to silicone manufacturers.

Another group of compounds coming with the scope of Formula (1) above and which may be utilized as adhesion promoters are compounds of the formula $$R^{30}CH=\underset{\underset{R^{31}}{|}}{C}-\underset{\underset{}{\overset{O}{\|}}}{C}-O-R^{12}-\underset{\underset{R_t^{11}}{|}}{Si}(OR^{10})_{3-t} \quad (15)$$

where $R^{10}$, $R^{11}$ and t are as previously defined. In Formulas (9-15), t can vary from 0 to 3 and $R^{12}$ is a $C_{(2-12)}$ divalent hydrocarbon radical as previously defined. Further $R^{30}$ and $R^{31}$ are selected from class consisting of hydrogen, $C_{(1-8)}$ monovalent hydrocarbon radicals, and mixtures thereof. It should be noted that $R^{30}$ and $R^{31}$ can be substituted or unsubstituted. A preferred compound coming within the scope of Formula (15) above is γ-methacryloxypropyltrimethoxysilane. Other specific compounds coming with the Formula (15) which can be utilized in the instant invention
γ-acryloxypropyltrimethoxysilane
γ-acryloxypropyltriethoxysilane
γ-methacrylpropyltriethoxysilane
γ-methacryloxypropyltris(methoxyethoxy)silane
γ-methacryloxypropylmethyldimethoxysilane
γ-methacryloxyethyltrimethoxysilane Such compounds can be produced by taking the corresponding olefinic acrylate and reacting it with a hydride alkoxy silane in the presence of a platinum catalyst under much the same conditions as in the production of the other adhesion promoters. Such compounds are as set forth in the patent application of Keating, Ser. No. 109,727, filed Jan. 4, 1980, and the preparation and production of such compounds are more fully disclosed in the foregoing patent application. In accordance with the foregoing disclosure of Keating, such compounds can be prepared by a worker skilled in the art with facility either utilizing the method disclosed above or utilizing other methods.

The method disclosed above is the simplest method for the preparation of such compounds.

Finally, another class of compounds coming within the scope of Formula (1) which can be utilized as adhesion promoters in the invention of the instant case is compounds of the Formula $$(R^{10}O)_{3-t}-\underset{\underset{R_t^{11}}{|}}{Si}-R^{12}-O\overset{\overset{O}{\|}}{C}R^{33} \quad (16)$$

where $R^{10}$, $R^{11}$, t are as previously defined, $R^{12}$ is a $C_{(2-12)}$ divalent hydrocarbon radical, as previously defined, and $R^{33}$ is a $C_{(1-8)}$ monovalent hydrocarbon radical. The $R^{12}$ radical can be any of the $R^{12}$ radicals that have been given previously in the preparation of the other class of compounds and may be substituted or unsubstituted and saturated or unsaturated. Preferably, $R^{33}$ is methyl and the compound is acetoxypropyltrimethoxysilane. Other compounds coming within the scope of Formula (16) above are as follows:
2-acetoxyethyltrimethoxysilane
2-acetoxyethyltriethoxysilane
3-benzoxypropylmethyldimethoxysilane
3-benzoxypropyltrimethoxysilane
3-benzoxypropyltriethoxysilane
3-benzoxypropylmethyldiethoxysilane
2-acetoxypropylmethyldimethoxysilane
2-acetoxypropylmethyldiethoxysilane
2-acetoxypropyltriethoxysilane Again, the above class of compounds of Formula (16) above may be produced by any method but it is more preferred to be produced by reacting the appropriate hydride silane with an olefinic carboxylate or acyloxy functional compound in the presence of a platinum catalyst under much the same conditions as was utilized to produce the other compounds. The conditions for such reactions can take place from room temperature to 120° to 150° C. and the reaction is an addition reaction which takes place readily in a period of time varying from 30 minutes to 24 hours. The reaction can take place either under atmospheric pressure or vacuum. Utilizing such a procedure, and the above disclosures, a worker skilled in the art can produce the above compounds.

Furthermore, most of the above chemicals can be obtained from specialty chemical houses such as: Petrarch Systems, Inc., P.O. Box 141, Levittown, Pa., 19059; Union Carbide, Connecticut; Dow-Corning, Michigan; and Silar Laboratories, 10 Alplaus Road, Scotia, N.Y., 12302.

The foregoing adhesion promoters may be incorporated into the one-component RTV compositions in any fashion. Thus they may be incorporated into the system by first producing the endcap polymer, and then adding the scavenger, and then the adhesion promoter, filler, and other ingredients. Alternatively, all the ingredients may be mixed together at the same time, or there may be many variations of these mixing procedures. The most preferred mixing procedure is to end-cap the silanol polymer with a cross-linking agent first, and then add the adhesion promoter along with the filler condensation catalyst and other ingredients. This produces a more preferable RTV composition with the most desirable properties as well as being the easiest to manufacture.

The Examples given below are given for the purpose of illustrating the present invention. They are not given for any purpose of setting limits or boundaries to the instant invention. All parts in the examples are by weight.

EXAMPLE 1

A suitable mixture equipped with a vacuum line and nitrogen purge was charged with 100 parts by weight of methyldimethoxy capped polydimethylsiloxane polymer of 120,000 centipoise viscosity at 25° C. with 0.6% by weight of di-n-hexylamine, 17 parts of cyclooctamethyltetrasiloxane treated fumed silica filler, 20 parts of a silanol containing trimethylsiloxy end stopped dimethylpolysiloxane fluid of 100 centipoise viscosity at 25° C., 10 parts by weight of a silanol containing fluid having 20 mole percent of monomethylsiloxy units, 76 mole percent of dimethylsiloxy units, and 4 mole percent of trimethylsiloxy units with 0.5 mole percent silanol groups, and 0.2 parts of polyether as a thixotrope which is sold under the trade name of UCON LB-1145 which is a tradename of a polyether sold by the Union Carbide Corporation, Connecticut. This mixture was agitated under full vacuum (22 mm Hg) at room temperature for two hours to give an RTV base. To this base was added 2 parts of hexamethyldisilazane and 1 part methyltrimethoxy silane. Following a 15-minute mix at room temperature using a SemKit ® mixer, a solution comprised of 1 part 3(-2-aminoethylamino)propyltrimethoxysilane and 0.2 parts of dibutyltindiacetate was added to the RTV composition followed by a second 15-minute mix at room temperature using a SemKit ® mixer.

Following mixing, the material was placed in sealed aluminum tubes and stored for 24 hours at room temperature, 24 hours at 100° C. and 48 hours at 100° C. After aging, the material was made into ASTM sheets and allowed to cure three days at room temperature and 50% relative humidity. After curing, a physical property profile to illustrate the properties of the composition. The flow rate of the uncured mixture was tested with a flow test jig as described in military specification MIL-A-46106A. Flow measurement was taken after 3 minutes.

Application Rate

The equipment necessary for the application rate test is as follows:

Equipment

Semoco #250 Sealant Gun
Semco #250-C6 6 oz. polyethylene cartridges and #250 polyethylene plungers.
Compressed Air Source with Regulator, 90±0.5 psig.
Stainless Steel Nozzle—2.000±0.005" length×0.54±0.005" diameter. Center bored 0.1990"±0.0005" hole. Threaded with ½" pipe thread at one end, ½" length.
Centigrade Thermometer.
Stopwatch.
Aluminum Dishes—2⅜" dia.×⅝" deep.
Balance—capable of weighing to 0.1 gm. accuracy.
Standard Conditions: 73±3° F., 50–10% R.H.
Constant Temperature Bath at 23±1° C.
SemKit ® Mixer.

Procedure

Sample is checked for temperature; if above 23±1° C. condition the sample until the proper temperature is obtained.

Install the stainless steel nozzle into the cartridge. Insert the cartridge into the Semco gun and connect it to 90±0.5 psi air source.

Extrude a few grams of sealant to clean any entrapped air and to fill the nozzle.

Extrude the sealant into a tared container for exactly 15 seconds. Care must be taken to start and stop the air pressure precisely on time to ensure a 15 second spacer.

Weigh the tared cup with extruded sealant to determine weight of 15 second extruded sealant. Multiply 15 sec. weight by (4) to obtain 60 sec. extruded weight. Application rate is reported in gm/min.

Tack-Free Time

Determined by simple finger touch test.
Utilizing these tests, the following data was obtained.

TABLE I

| Property | 24 hr/RT | 24 hr/100° C. | 48 hr/100° C. |
|---|---|---|---|
| Flow, inch | 0.8" | — | — |
| Application Rate g/min. | 123 | — | — |
| Specific Gravity | 1.05 | — | — |
| Tack free Time, (min.) | 10 | — | — |

The physical property profile of the composition was also obtained for the various accelerated and unaccelerated shelf aged samples. The results are set forth in Table II below.

TABLE II

| Property | 24 hr/RT | 24 hr/100° C. | 48 hr/100° C. |
|---|---|---|---|
| Hardness, Shore A | 15 | 16 | 15 |
| Tensile Strength (psi) | 254 | 213 | 210 |
| Elongation (%) | 676 | 715 | 653 |
| Modulus (75%) | 42 | 42 | 44 |

The composition of this example was also tested for primerless adhesion to aluminum, glass, polyacrylate, polycarbonate, polyvinylchloride and concrete after the RTV material was aged for 24 hours at room temperature. Peel specimens were prepared and allowed to cure for five days at room temperaat 50% relative humidity before pulling. The results are given in Table III below.

TABLE III

| Substrate | Peel Adhesion ppi/% Cohesive Failure |
|---|---|
| Glass | 56/60 |
| Aluminum (anodized) | 37/80 |
| Aluminum (alclad) | 42/60 |
| Polyacrylate | 10/0 |
| Concrete | 12/5 |
| Polycarbonate | 43/100 |
| PVC | 25/10 |

As the data in Table III above indicates, the foregoing self-bonding adhesion promoter gave good self-bonding additive properties to the composition in the absence of a primer to many substrates. In the case of some substrates, such as polycarbonates, adhesion was excellent.

EXAMPLE 2

The same composition as in Example 1 was prepared except there was present, instead of 3-(2-aminoethylamino)-propyltrimethoxysilane, tri(trimethoxysilylpropyl)isocyanurate at the concentration of 1.50 parts. Using the same preparation technique and peel adhesion procedure as outlined in Example 1, the following peel adhesion results were obtained.

| Substrate | Peel Adhesion ppi/% Cohesive Failure |
|---|---|
| Glass | 22/100 |
| Aluminum (anodized) | 25/90 |
| Aluminum (alclad) | 28/95 |
| Concrete | 33/10 |
| Polyacrylate | 0/0 |

EXAMPLE 3

The same composition as in Example 1 was prepared except there was present, instead of 3-(2-aminoethylamino)-propyltrimethoxysilane, glycidoxypropyltrimethoxysilane at the concentration of 1.50 parts. Using the same preparation technique and peel adhesion procedure as outlined in Example 1, the following peel adhesion results were obtained.

| Substrate | Peel Adhesion ppi/% Cohesive Failure |
|---|---|
| Glass | 44/100 |
| Aluminum (anodized) | 46/60 |
| Aluminum (alclad) | 55/100 |
| Concrete | 32/60 |
| Polyacrylate | 0/0 |

EXAMPLE 4

The same composition as in Example 1 was prepared except there was present, instead of 3-(2-aminoethylamino)-propyltrimethoxysilane, β-(3,4-epoxycyclohexyl)ethyltrimethoxysilane at the concentration of 1.50 parts. Using the same preparation technique and peel adhesion procedure as outlined in Example 1, the following peel adhesion results were obtained.

| Substrate | Peel Adhesion ppi/% Cohesive Failure |
|---|---|
| Glass | 35/100 |
| Aluminum (anodized) | 35/50 |
| Aluminum (alclad) | 28/100 |
| Concrete | 13/0 |
| Polyacrylate | 0/0 |

EXAMPLE 5

The same composition as in Example 1 was prepared except there was present, instead of 3-(2-aminoethylamino)-propyltrimethoxysilane, vinyltrimethoxysilane at the concentration of 1.50 parts. Using the same preparation technique and peel adhesion procedure as outlined in Example 1, the following peel adhesion results were obtained.

| Substrate | Peel Adhesion ppi/% Cohesive Failure |
|---|---|
| Glass | 35/100 |
| Aluminum (anodized) | 35/95 |
| Aluminum (alclad) | 35/100 |
| Concrete | 18/0 |
| Polyacrylate | 0/0 |

EXAMPLE 6

The same composition as in Example 1 was prepared except there was present, instead of 3-(2-aminoethylamino)-propyltrimethoxysilane, γ-isocyanatopropyltrimethoxysilane at the concentration of 1.50 parts. Using the same preparation technique and peel adhesion procedure as outlined in Example 1, the following peel adhesion results were obtained:

| Substrate | Peel Adhesion ppi/% Cohesive Failure |
|---|---|
| Glass | 29/100 |
| Aluminum (anodized) | 9/0 |
| Aluminum (alclad) | 31/100 |
| Concrete | 10/0 |
| Polyacrylate | 0/0 |

EXAMPLE 7

The same composition as in Example 1 was prepared except there was present, instead of 3-(2-aminoethylamino)-propyltrimethoxysilane, cyanopropyltrimethoxysilane at the concentration of 1.50 parts. Using the same preparation technique and peel adhesion procedure as outlined in Example 1, the following peel adhesion results were obtained:

| Substrate | Peel Adhesion ppi/% Cohesive Failure |
|---|---|
| Glass | 29/95 |
| Aluminum (anodized) | 7/0 |
| Aluminum (alclad) | 31/100 |
| Concrete | 17/50 |
| Polyacrylate | 0/0 |

EXAMPLE 8

The same composition as in Example 1 was prepared except there was present, instead of 3-(2-aminoethylamino)-propyltrimethoxysilane, methacryloxypropyltrimethoxysilane at the concentration of 1.50 parts. Using the same preparation technique and peel adhesion procedure as outlined in Example 1, the following peel adhesion results were obtained:

| Substrate | Peel Adhesion ppi/% Cohesive Failure |
|---|---|
| Glass | 35/95 |
| Aluminum (anodized) | 8/0 |
| Aluminum (alclad) | 12/5 |
| Concrete | 11/0 |
| Polyacrylate | 0/0 |

EXAMPLE 9

The same composition as in Example 1 was prepared except there was present, instead of 3-(2-aminoethylamino)-propyltrimethoxysilane, cyanoethyltrimethoxysilane at the concentration of 1.50 parts. Using the same preparation technique and peel adhesion procedure as outlined in Example 1, the following peel adhesion results were obtained.

| Substrate | Peel Adhesion ppi/% Cohesive Failure |
|---|---|
| Glass | 24/100 |
| Aluminum (anodized) | 23/90 |
| Aluminum (alclad) | 27/95 |
| Concrete | 14/10 |
| Polyacrylate | 0/0 |

EXAMPLE 10

The same composition as in Example 1 was prepared except there was present, instead of 3-(2-aminoethylamino)-propyltrimethoxysilane, aminopropylmethyldimethoxysilane at the concentration of 1.50 parts. Using the same preparation technique and peel adhesion procedure as outlined in Example 1, the following peel adhesion results were obtained:

| Substrate | Peel Adhesion ppi/% Cohesive Failure |
|---|---|
| Glass | 8/0 |
| Aluminum (anodized) | 15/10 |
| Aluminum (alclad) | 31/50 |
| Concrete | 17/10 |
| Polyacrylate | 0/0 |

EXAMPLE 11

The same composition as in Example 1 was prepared except there was present, instead of 3-(2-aminoethylamino)-propyltrimethoxysilane, 3-Acetoxypropyl-trimethoxysilane at the concentration of 1.50 parts. Using the same preparation technique and peel adhesion procedure as outlined in Example 1, the following peel adhesion results were obtained:

| Substrate | Peel Adhesion ppi/% Cohesive Failure |
|---|---|
| Glass | 27/50 |
| Aluminum (anodized) | 0/0 |
| Aluminum (alclad) | 23/100 |
| Concrete | 10/0 |
| Polyacrylate | 0/0 |

The adhesion promoters of the present case are preferably used with the RTV compositions of Dziark, U.S. Pat. No. 4,417,042. In one instance, Dziark discloses certain preferred silazane, compounds as scavengers for the RTV systems of White et al., U.S. Pat. No. 4,395,526. The preferred systems of Dziark, U.S. Pat. No. 4,417,042, comprise first forming a polyalkoxy diorganopolysiloxane polymer and then having a scavenging compound separate from the cross-linking agent which compound is a silazane monomer or polymer, or certain amine polymeric compounds. The adhesion promoters of the present case can also be utilized either with the compositions of White et al., U.S. Pat. No. 4,395,526, or with the compositions of Dziark, U.S. Pat. No. 4,417,042, along with the additives disclosed in Beers, Ser. No. 349,537, filed Feb. 17, 1982, to produce an advantageous one-component, low modulus, fast-curing shelf stable, self-bonding, RTV system. It should be noted that the scavengers of Dziark, U.S. Pat. No. 4,417,042, are separate compounds and in addition to the cross-linking agent. Such compositions are disclosed in the White et al., U.S. Pat. No. 4,395,526, in addition to other alkoxy-functional RTV systems. A short synopsis of the Dziark, U.S. Pat. No. 4,417,042, system is disclosed below. For more information as to such scavengers and RTV systems, one is referred to the disclosure of Dziark, U.S. Pat. No. 4,417,042. In accordance with Dziark, U.S. Pat. No. 4,417,042, the present adhesion promoters can be utilized with a stable, one-package, substantially anhydrous and substantially acid-free, room temperature vulcanizable organopolysiloxane composition stable under ambient conditions in the substantial absence of moisture over an extended period of time and convertible to a tack-free elastomer having (1) an organopolysiloxane wherein the silicon atom at each polymer chain end is terminated with at least 2 alkoxy radicals; (2) an effective amount of a condensation catalys; (3) a stabilizing amount of scavenger for hydroxy functional groups which is a silicon-nitrogen compound selected from the class consisting of (A) a silicon-nitrogen compound having the formula

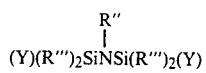

$(Y)(R''')_2SiNSi(R''')_2(Y)$ where Y is selected from $R'''$ and $R_2''N$— and (B) a silicon-nitrogen polymer comprising (i) from 3 to 100 mole percent chemically combined structural units selected from the class consisting of units having the formula

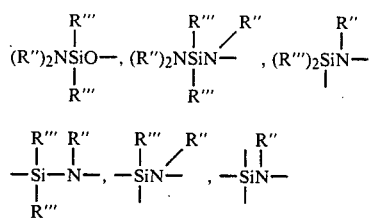

and (ii) from 0 to 97 mole percent chemically combined structural units represented by the formula

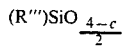

and mixtures thereof where the silicon atoms of said silicon-nitrogen polymer are joined to each other by a member selected from an SiOSi linkage and a SiNR"Si linkage, the free valences of said silicon atoms other than those joined to oxygen to form a siloxy unit and nitrogen to form a silazy unit are joined to a member selected from and $R'''$ radical and $(R'')_2N$ radical, and where the ratio of the sum of said $R'''$ radicals and said $(R'')_2N$ radicals to the silicon atoms of said silicon-nitrogen polymer has a value of 1.5 to 3, inclusive, and $R''$ is a member selected from the class consisting of hydrogen and monovalent hydrocarbon radicals, and fluoroalkyl radicals, R''' is a member selected from hydrogen, monovalent hydrocarbon radicals and fluoroalkyl radicals, and c is a whole number equal to 0 to 3, inclusive, and (4) one of the adhesion promoters of the present case.

There is present from 0.5 to 10 parts by weight of the silicone scavenger per 100 parts by weight of the organopolysiloxane. The silazane polymers can include cyclic silazanes of chemically combined

units where R'', R''' are as previously defined to provide for a ratio of 1.5 to 3.0 of the sum of the R''' and (R'')$_2$N radicals per silicon atom in said silazane polymer.

The silazane polymer can comprise linear polymers having at least one unit selected from the class consisting of units, and

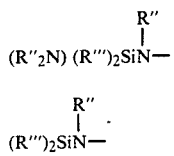

units where R'', R''' are as previously defined to provide for a ratio of 1.5 to 3 of the sum of the R''' and (R'')$_2$N radicals per silicon atom in said silazane polymer.

The silazane polymers comprise linear polymers consisting essentially of

units where R'' and R''' are as defined to provide for a ratio of 1.5 to 3.0 of the sum of the R''' and (R'')$_2$N radicals per silicon atom in said silazane polymer.

The silazane polymers can have at least one unit selected from the class consisting of

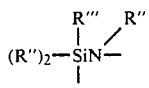

units and

units where R'' and R''' are as previously defined to provide for a ratio of 1.5 to 3 of the sum of the R''' and (R'')$_2$N radicals per silicon atom in said silazane polymer.

The silazane polymer can comprise polymers having a sufficient amount of units selected from

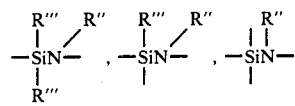

where R'' and R''' are as previously defined to provide for a ratio of 1.5 to 3 of the sum of the R''' and (R'')$_2$N radicals per silicon atom in said silazane polymer.

Further, the silazane-siloxane compounds can be copolymers with up to 97 mole percent of

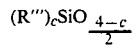

units with most of the units being selected from

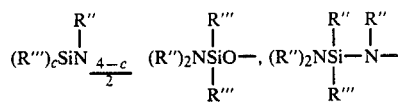

where R'' and R''', and c are as previously defined to provide for a ratio of the sum of R'''+(R'')$_2$N radicals per silicon atom of said silazane-siloxane copolymer of from 1.5 to 3.

The cyclic silazane-siloxane compounds are cyclics consisting of chemically combined (R''')$_2$SiO units and

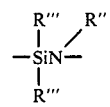

units where R'' and R''' are as previously defined.

Further, the silazane nitrogen compounds can be linear and cyclic silazane having the formula

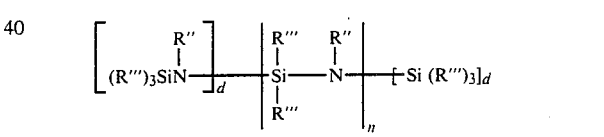

where R'' and R''' are as previously defined where n is a positive whole number and is preferably 0 to 20, inclusive, and d is a whole number equal to 0 to 1, inclusive, and where d is equal to 0, n is preferably equal to 3 to 7, inclusive.

Further, the silazane nitrogen compound is a polysiloxane having the formula

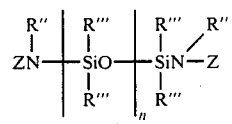

where R'', R''' and n are as defined previously and Z is a number selected from R'' and —Si(R''')$_3$.

The silicon nitrogen compound is preferably selected from hexamethyldisilazane, hexamethylcyclotrisilazane, octamethylcyclotetrasilazane, a silicon nitrogen compound that has the formula

[CF$_3$—CH$_2$—CH$_2$—(CH$_3$)$_2$—Si]$_2$NH and a silicon nitrogen compound that has the formula

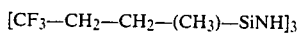
[CF$_3$—CH$_2$—CH$_2$—(CH$_3$)—SiNH]$_3$ and a silicon nitrogen compound which has the formula,

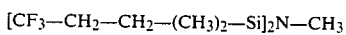
[CF$_3$—CH$_2$—CH$_2$—(CH$_3$)$_2$—Si]$_2$N—CH$_3$

What is claimed is:

1. A method of making a one-package and substantially acid-free room temperature vulcanizable composition curable to the solid elastomeric state, which method comprises agitating under substantially anhydrous conditions at a temperature in the range of from 0° C. to 180° C., a room temperature vulcanizable material selected from
   (i) a mixture comprising
       (a) 100 parts of a silanol-terminated polydiorganosiloxane,
       (b) a stabilizing amount of a scavenger for hydroxy functional groups,
       (c) 0–10 parts of a polyalkoxy crosslinking agent,
       (d) an effective amount of a condensation catalyst,
       (e) 0–5 parts of a curing accelerator selected from the group consisting of substituted guanidines, amines and mixtures thereof, and
       (f) an effective amount of an adhesion promoter having the formula

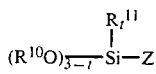

where R$^{10}$ and R$^{11}$ are C$_{1-8}$ monovalent hydrocarbon radicals, t varies from 0 to 3 and Z is a saturated, unsaturated or aromatic hydrocarbon radical, said hydrocarbon radical further functionalized by a member selected from the group consisting of amino, ether, epoxy, isocyanato, cyano, isocyanurate, acryloxy and acyloxy and mixtures thereof; and (ii) a mixture comprising
       (a) 100 parts of a polyalkoxy-terminated polydiorganosiloxane,
       (b) 0–10 parts of a polyalkoxy crosslinking agent,
       (c) an effective amount of condensation catalyst,
       (d) a stabilizing amount of scavenger for hydroxy functional groups,
       (e) 0–5 parts of a curing accelerator selected from the group consisting of substituted guanidines, amines and mixtures thereof, and
       (f) an effective amount of an adhesion promoter having the formula

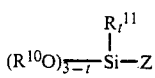

where R$^{10}$ and R$^{11}$ are C$_{1-8}$ monovalent hydrocarbon radicals, t varies from 0 to 3, and Z is a saturated, unsaturated, or aromatic hydrocarbon radical further functionalized by a member selected from the group consisting of amino, ether, epoxy, isocyanato, cyano, isocyanurate, acryloxy and acyloxy and mixtures thereof.

2. the method of claim 1 wherein Z is a saturated, unsaturated or aromatic hydrocarbon radical further functionalized by an amine group to provide an adhesion promoter of the formula

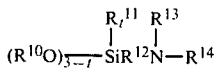

where R$^{10}$ and R$^{11}$ are C$_{1-8}$ monovalent hydrocarbon radicals, R$^{12}$ is a C$_{2-12}$ divalent hydrocarbon radical, R$^{13}$ and R$^{14}$ are selected from the group consisting of hydrogen, amine radicals and C$_{1-8}$ monovalent hydrocarbon radicals and mixtures thereof, and t varies from 0 to 3.

3. The method of claim 1 wherein Z is a saturated, unsaturated or aromatic hydrocarbon radical further functionalized by an isocyanurate radical to provide an adhesion promoter of the formula

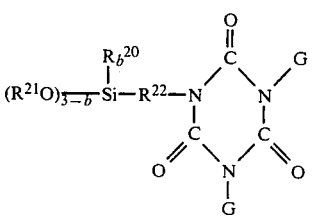

where G is selected from the group consisting of monovalent hydrocarbon radicals, halogenated monovalent hydrocarbon radicals, and radicals of the formula

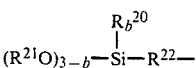

and where R$^{20}$ is a C$_{1-8}$ monovalent hydrocarbon radical or halogenated monovalent hydrocarbon radical; R$^{21}$ is a C$_{1-8}$ monovalent hydrocarbon radical, halogenated monovalent hydrocarbon radical or cyanoalkyl radical; R$^{22}$ is a C$_{2-12}$ divalent hydrocarbon radical selected from alkylenearylene, alkylene and cycloalkylene and halogenated alkylenearylene, alkylene and cycloalkylene, and where b varies from 0 to 3.

4. The method of claim 1 wherein Z is a saturated, unsaturated or aromatic hydrocarbon radical further functionalized by a radical of the formula

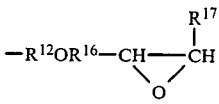

to provide an adhesion promoter of the formula

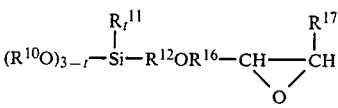

where R$^{10}$ and R$^{11}$ are C$_{1-8}$ monovalent hydrocarbon radicals, R$^{12}$ and R$^{16}$ are C$_{2-12}$ divalent hydrocarbon radicals, R$^{17}$ is selected from the group consisting of hydrogen and C$_{1-8}$ monovalent hydrocarbon radicals, and t varies from 0 to 3.

5. The method of claim 1 wherein Z is a saturated, unsaturated or aromatic hydrocarbon radical further functionalized by an epoxy group to provide an adhesion promoter of the formula

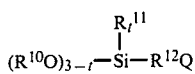

where $R^{10}$ and $R^{11}$ are $C_{1-8}$ monovalent hydrocarbon radicals, $R^{12}$ is a $C_{2-12}$ divalent hydrocarbon radical, Q is an epoxy functional radical having a saturated hydrocarbon ring attached thereto and t varies from 0 to 3.

6. The method of claim 1 wherein Z is a saturated, unsaturated or aromatic hydrocarbon radical further functionalized by an isocyanato group to provide an adhesion promoter of the formula

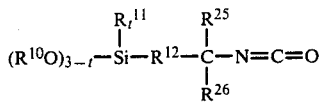

where $R^{10}$ and $R^{11}$ are $C_{1-8}$ monovalent hydrocarbon radicals, $R^{12}$ is a $C_{2-12}$ divalent hydrocarbon radical, $R^{25}$ and $R^{26}$ are selected from the group consisting of hydrogen and $C_{1-8}$ monovalent hydrocarbon radicals, and t varies from 0 to 3.

7. The method of claim 1 wherein Z is a saturated, unsaturated or aromatic hydrocarbon radical further functionalized by a cyano group to provide an adhesion promoter of the formula

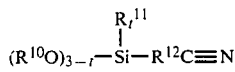

where $R^{10}$ and $R^{11}$ are $C_{1-8}$ monovalent hydrocarbon radicals, $R^{12}$ is a $C_{2-12}$ divalent hydrocarbon radical, and t varies from 0 to 3.

8. The method of claim 1 wherein Z is a saturated, unsaturated or aromatic hydrocarbon radical further functionalized by an acryloxy radical to provide an adhesion promoter of the formula

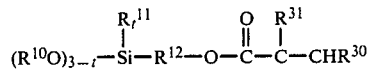

where $R^{10}$ and $R^{11}$ are $C_{1-8}$ monovalent hydrocarbon radicals, $R^{12}$ is a $C_{2-12}$ divalent hydrocarbon radical, $R^{30}$ and $R^{31}$ are selected from the group consisting of hydrogen and $C_{1-8}$ monovalent hydrocarbon radicals and t varies from 0 to 3.

9. The method of claim 1 wherein Z is a saturated, unsaturated or aromatic hydrocarbon radical further functionalized by an acyloxy radical to provide an adhesion promoter of the formula

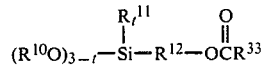

where $R^{10}$ and $R^{11}$ are $C_{1-8}$ monovalent hydrocarbon radicals, $R^{12}$ is a $C_{2-12}$ divalent hydrocarbon radical, $R^{33}$ is a $C_{1-8}$ monovalent hydrocarbon radical and t varies from 0 to 3.

10. A mixture comprising:
(a) 100 parts of a silanol-terminated or polyalkoxy-terminated polydiorganosiloxane,
(b) a stabilizing amount of a scavenger for hydroxy functional groups,
(c) 0–10 parts of a polyalkoxy crosslinking agent,
(d) an effective amount of a condensation catalyst,
(e) 0–5 parts of a curing accelerator selected from the group consisting of substituted guanidines, amines, and mixtures thereof, and
(f) an effective amount of an adhesion promoter having the formula

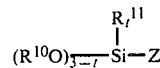

where $R^{10}$ and $R^{11}$ are $C_{1-8}$ monovalent hydrocarbon radicals, t varies from 0 to 3, and Z is a saturated, unsaturated or aromatic hydrocarbon radical, said hydrocarbon radical further functionalized by a member selected from the group consisting of amino, ether, epoxy, isocyanato, cyano, isocyanurate, acryloxy, and acyloxy and mixtures thereof.

* * * * *